United States Patent [19]
Eguchi

[11] Patent Number: 5,347,500
[45] Date of Patent: Sep. 13, 1994

[54] COMPACT OPTICAL PICKUP HEAD WITH TRACKING ERROR SIGNAL GENERATOR

[75] Inventor: Naoya Eguchi, Tokyo, Japan

[73] Assignee: Sony Corporation, Tokyo, Japan

[21] Appl. No.: 159,080

[22] Filed: Nov. 29, 1993

Related U.S. Application Data

[63] Continuation of Ser. No. 533,930, Jun. 6, 1990, abandoned.

[30] Foreign Application Priority Data

Jun. 21, 1989 [JP] Japan .................................. 1-158529

[51] Int. Cl.$^5$ .............................................. G11B 7/00
[52] U.S. Cl. ............................... 369/44.14; 369/44.16; 369/44.22
[58] Field of Search ............... 369/44.16, 44.15, 44.17, 369/44.22, 111, 112, 44.14, 44.18, 44.19, 44.21; 360/78.13

[56] References Cited

U.S. PATENT DOCUMENTS

| 4,443,721 | 4/1984 | Jansen | 369/44.16 |
|---|---|---|---|
| 4,504,935 | 3/1985 | Jansen | 369/44.16 |
| 4,545,046 | 10/1985 | Jansen et al. | 369/44.16 |
| 4,607,913 | 8/1986 | Jansen | 369/44.16 |
| 4,688,201 | 8/1987 | Towner et al. | 369/44.19 |
| 4,798,447 | 1/1989 | Jansen et al. | 369/44.16 |

FOREIGN PATENT DOCUMENTS

| 0203816 | 12/1986 | European Pat. Off. | G11B 7/135 |
|---|---|---|---|
| 63-009026 | 1/1988 | Japan | 369/44.14 |
| 63-271760 | 11/1988 | Japan | 369/44.14 |
| 1150241 | 6/1989 | Japan | G11B 7/135 |
| 01194848 | 8/1989 | Japan | . |

*Primary Examiner*—Aristotelis Psitos
*Assistant Examiner*—P. W. Huber
*Attorney, Agent, or Firm*—Lewis H. Eslinger; Jay H. Maioli

[57] ABSTRACT

An optical pickup head apparatus comprises a yoke provided in an opposing relation to a magnet, a movable member having formed therethrough an aperture into which the yoke is inserted and around which a first coil is wound in an opposing relation to the magnet, an object lens supporting device having a pair of leaf springs for supporting the objective lens so that the objective lens can move in the direction parallel to the optical axis thereof and a plurality of second coils of substantially square shape for moving the objective lens in the direction parallel to the optical axis thereof and a tracking control device for rotating a mirror portion so that a beam spot focused on the optical disc by the objective lens follows a track on the optical disc, wherein the objective lens supporting device is secured to the movable member, the movable member is movably supported by the yoke and sides of the second coils which cross the optical axis of the objective lens and the first coil are located within a common magnetic gap.

2 Claims, 5 Drawing Sheets

COMPACT OPTICAL PICKUP HEAD WITH TRACKING ERROR SIGNAL GENERATOR

This is a continuation of application Ser. No. 07/533,930, filed Jun. 6, 1990 now abandoned.

BACKGROUND OF THE INVENTION

1. Field of the Invention

The present invention relates generally to optical pickup head apparatus and, more particularly, is directed to an optical pickup head apparatus for use, for example, in a recording and/or reproducing apparatus which records and/or reproduces a so-called optical disc such as a magneto-optical disc and the like.

2. Description of the Prior Art

An optical disc recording and/or reproducing apparatus is known for recording and/or reproducing a so-called optical disc such as a magneto-optical disc and the like. This type of optical disc recording and/or reproducing apparatus utilizes an optical pickup head apparatus of linear motor system to translate its objective lens. For example, U.S. Pat. Nos. 4,545,046 and 4,607,913 describe such type of optical pickup head apparatus. In that case, if two parallel guide rods are not supported very accurately, then this will impede a smooth movement of a movable portion to which an objective lens is attached. Further, in this type of optical pickup head apparatus, bearings attached to a movable portion become expensive. If the bearings are not equal in quality during the mass production, this will give rise to poor movement of the movable member.

Applicant's U.S. Pat. No. 4,864,170 describes a linear motor which can be applied to the aforenoted optical pickup head apparatus.

In order to gain a better understanding of the present invention, let us explain our previously-proposed linear motor (U.S. Pat. No. 4,864,170) with reference to FIGS. 1 and 2.

Figure 1:
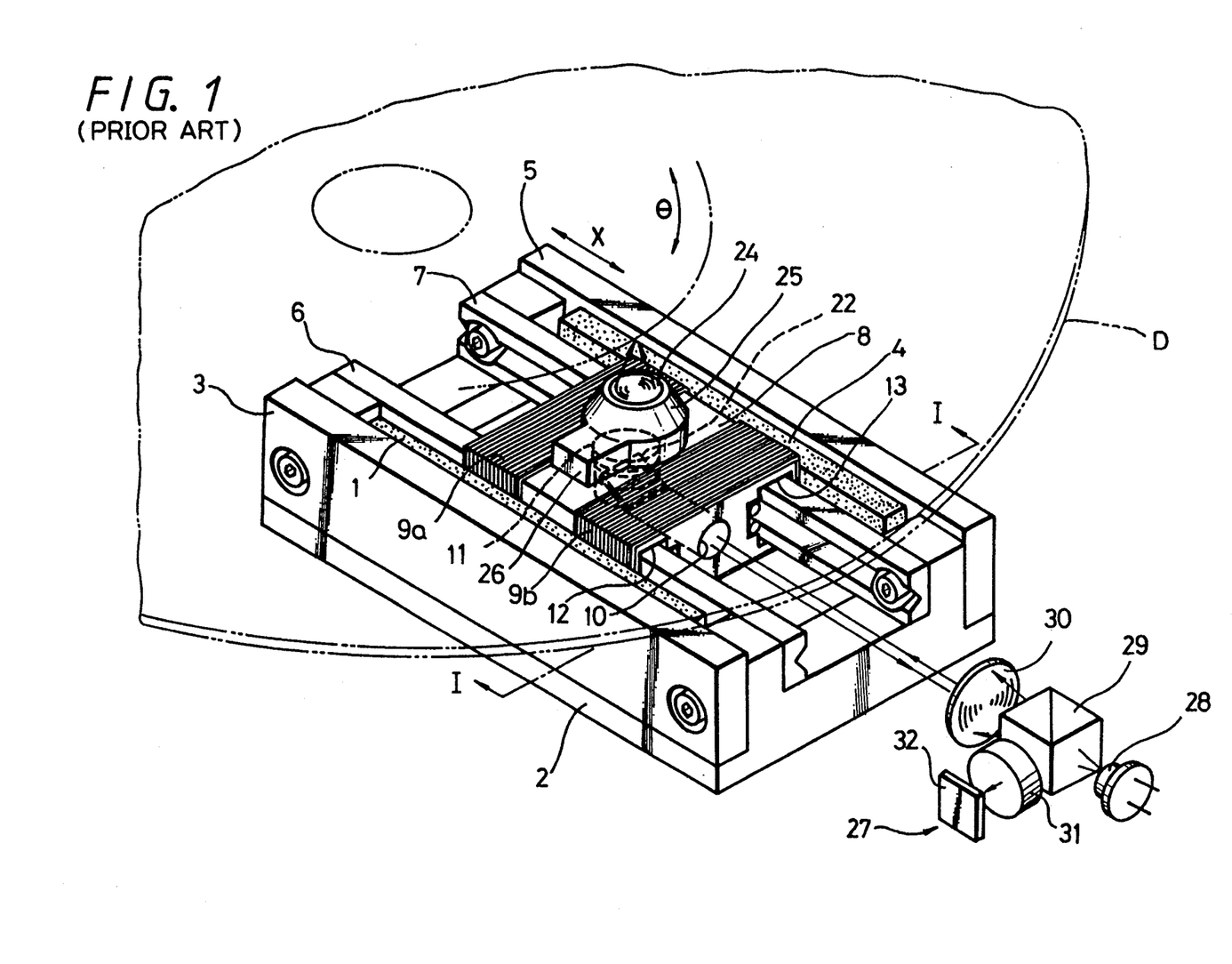
FIG. 1 is a perspective view of an example of a previously-proposed optical pickup apparatus.
Figure 2:
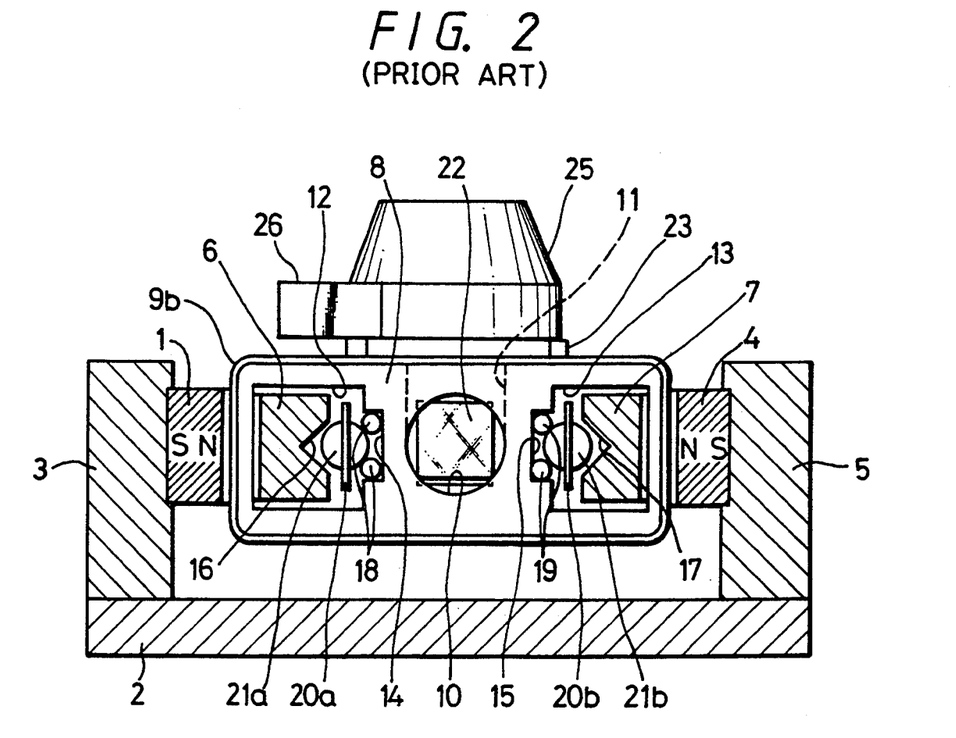
FIG. 2 is a transverse sectional view taken on the line I—I in FIG. 1.

FIG. 1 is a perspective view of such linear motor, and FIG. 2 is a transverse sectional view taken on the line I—I in FIG. 1.

As shown in FIGS. 1 and 2, there are shown two permanent stator magnets 1 and 4 which are both magnetized in the thickness direction thereof. A base plate 2 is made of a magnetizable material, for example, iron and on which there are secured two outside stator yokes 3 and 5. The permanent stator magnet 1 is attached to the inner side of the outside stator yoke 3, and the permanent stator magnet 4 is similarly attached to the inner side of the outside stator yoke 5 with a predetermined clearance relative to the permanent stator magnet 1. Enclosing the permanent stator magnets 1 and 4, inside stator yokes 6 and 7 are secured to the base plate 2 with a predetermined clearance between the magnets 1 and 4 such that they may form a closed magnetic path together with the outside stator yokes 3 and 5.

There is shown a frame or bobbin 8, and at least the outer peripheral portion of the bobbin 8 is made of a nonmagnetic material. A pair of coils 9a and 9b are wound around two end portions of the bobbin 8, and through-holes 10 and 11 are formed through the bobbin 8 so that the through-holes 10 and 11 cross each other in the front and rear direction as well as the upper and lower direction.

The bobbin 8 has formed therethrough a pair of apertures 12 and 13 which penetrate the pair of coils 9a and 9b. The above-described inside yokes 6 and 7 are inserted into the pair of apertures 12 and 13.

Guide grooves 14, 15 and 16, 17 are formed on the inside surfaces of the apertures 12 and 13 and on the opposite surfaces of the inside yokes 6 and 7 in which the inside yokes 6 and 7 are not opposed to the magnets 1 and 4. As shown in FIG. 2, a pair of shafts 18 and 19 are attached to the insides of the guide grooves 14 and 15 formed on the apertures 12 and 13, and balls 21a and 21b are supported by supporting members 20a and 20b within these guide grooves 14, 15 and 16, 17. Therefore, the bobbin 8 is supported to the inside yokes 6 and 7 via the balls 21a and 21b, whereby the bobbin 8 can freely deviate along the longitudinal direction of the inside yokes 6 and 7.

A reflection mirror 22 for changing a light path is secured to a portion in which the through-holes 10 and 11 cross each other in the front and rear direction and in the upper and lower direction of the bobbin 8. An optical pickup 25 having an objective lens 24 is attached to the exit side of the vertically-elongated through-hole 11 via a mount 23. The optical pickup 25 is opposed to an optical disc D and includes a focusing motor 26 to move the objective lens 24 in the optical axis direction of the objective lens 24.

As shown in FIG. 1, a read-out optical system 27 is located in the direction in which the through-hole 10 formed through the bobbin 8 in the front and rear direction is extended in the rearward. The read-out optical system 27 comprises of a laser diode 28, a beam splitter 29, a collimator lens 30, a light receiving system 31, a photodiode 32 and the like. In accordance with the read-out optical system 27, a light beam emitted from the laser diode 28 travels through a light path formed of the collimator lens 30, the reflection mirror 22, the objective lens 24 of the optical pickup 25, the optical disc D, the objective lens 24, the reflection mirror 22, the collimator lens 30, the beam splitter 29 and the light receiving system 31, in that order and becomes incident on the photodiode 32.

In the previously-proposed optical pickup head apparatus constructed as described above, when the coils 9a and 9b provided at the two end portions of the bobbin 8 are both energized, the bobbin 8 is given a driving force according to a Fleming's left-hand rule provided on the basis of the action between the current and the magnetic field produced by the magnets 1, 4 and the yokes 3, 6 and 5, 7, i.e., a linear motor is constructed, whereby the optical pickup 25 is moved in the radial direction of the optical disc D. During this operation of the optical pickup 25, the objective lens 24 of the optical pickup 25 is driven by the focusing motor 26 so that the focusing of the objective lens 24 is adjusted.

In the prior-art optical pickup head apparatus shown in FIGS. 1 and 2, the linear motor for moving the optical pickup 25 is made compact in size because the bobbin 8 supporting the optical pickup 25 commonly utilizes the yokes 6 and 7 of the base plate 2 side as the guide shafts. However, the optical pickup 25 supported to the bobbin 8 is provided with the focusing motor 26 which moves the objective lens 24 and the focusing motor 26 and the feed linear motor constitute different magnetic circuits, whereby the focusing motor 26 and the feed linear motor are caused to interfere with each other between the two magnetic circuits. Thus, there is provided a magnetic neutral portion which frequently obstructs the movement of the optical pickup 25, i.e., the bobbin 8.

Further, the bobbin 8 is applied with the weights of the magnetic circuit of the focusing motor 26 so that the feeding mass is increased which results in that the access speed decreases. Simultaneously, the number of magnets forming the magnetic circuits is increased, which provides an increased cost.

OBJECTS AND SUMMARY OF THE INVENTION

Accordingly, it is a general object of the present invention to provide an improved optical pickup apparatus which can eliminate the shortcomings and disadvantages encountered with the prior art.

More specifically, it is a object of the present invention to provide an optical pickup apparatus in which a movable portion thereof can be made compact in size and reduced in weight.

It is another object of the present invention to provide an optical pickup apparatus which can be moved at high speed and with high stability.

It is a further object of the present invention to provide an optical pickup apparatus which can reduce costs considerably.

It is an additional object of the present invention to provide an optical pickup apparatus which is suitably applied to an optical disc recording and/or reproducing apparatus.

According to a first aspect of the present invention, in an optical pickup head apparatus having a tracking error signal generating device for generating a tracking error signal on the basis of a detected output from a photodetecting device and a tracking control device for performing a tracking servo by rotating a mirror portion in response to the tracking error signal supplied thereto, the optical pickup head apparatus comprises of yokes provided in an opposing relation to a magnet, a movable member having apertures into which the yokes are inserted and around which a first coil is wound in an opposing relation to the magnets, and an objective lens supporting device having a plurality of second coils to support an objective lens so that the objective lens can be moved in the direction parallel to an optical axis of the objective lens and which moves the objective lens in the direction parallel to the optical axis of the objective lens, wherein the objective lens supporting device is secured to the movable member, the movable member is supported by the yokes so that it can freely move, and at least one side of the first and second coils is provided within a common magnetic gap.

As a second aspect of the present invention, an optical pickup head apparatus comprises a stationary optical system formed of a laser light source, a photodetecting device, and a tracking control device for performing a tracking control so that a beam spot formed on an optical disc by a light beam emitted from the laser light source follows tracks on the optical disc, and a movable optical system formed of an objective lens being controlled to properly focus the light beam emitted from the laser light source on the optical disc and a light path changing device for changing a light path of the light beam emitted from the laser light source so that the light beam becomes incident on the objective lens, wherein the stationary optical system and the movable optical system are provided on the same plane.

These, and other objects, features and advantages of the present invention, will be apparent in the following detailed description of a preferred embodiment of the invention to be taken in conjunction with the accompanying drawings, in which like reference numerals are used to identify the same or similar parts in the several views.

DETAILED DESCRIPTION OF THE PREFERRED EMBODIMENT

An embodiment of the optical pickup apparatus according to the present invention will hereinafter be described in detail with reference to FIGS. 3 to 6.

Referring throughout FIGS. 3 to 6, there is shown a base plate 41 of a rectangular shape which is made of a rigid material. Outside yokes 42 and 43 of substantially U-letter shape are secured to the two side portions of the base plate 41 in the longitudinal direction of the surface of the base plate 41 in an opposing relation. Magnets 44 and 45, each being magnetized in the thickness direction, are attached to the inside surfaces of the outside yokes 42 and 43, respectively.

Further, inside yokes 46 and 47 are respectively coupled to the outside yokes 42 and 43 over inside two end faces 42a, 42b and 43a, 43b, whereby the magnets 44 and 45 are respectively encircled by them together with the outside yokes 42 and 43 to form a closed magnetic path. More specifically, the inside yokes 46 and 47 are held on stepped surfaces $42a_1$, $42b_1$ and $43a_1$, $43b_1$ formed on the inside two end faces of the outside yokes 42 and 43 by a predetermined height, thereby being secured to the inside two end faces 42a, 42b and 43a, 43b, respectively. Thus, magnetic gaps g of a predetermined width are respectively formed between the magnets 44 and 45 and the inside yokes 46 and 47, and the inside yokes 46 and 47 are supported on the surface of the base plate 42 by a predetermined spacing.

There is shown a movable member 48 which has formed therethrough apertures 49 and 50 crossing each other in the front and rear direction and in the upper and lower direction. A bobbin 51 made of a nonmagnetic material is engaged with the rear half portion of the movable member 48 such that a pair of through-holes 51a and 51b are respectively formed between two side surfaces 48a and 48b of the movable member 48 and the bobbin 51. A slide drive coil 52 is wound around the outer peripheral surface of the bobbin 51 as a first coil.

An objective lens supporting member 53 which is shaped as a rectangular frame is supported to the first half portion of the movable member 48 by parallel plate springs 54 and 55 so as to become freely movable in the upper and lower direction. An objective lens 56 is attached to the objective lens supporting member 53 in an opposing relation to the exit side of the through-hole 50 extended in the upper and lower direction of the movable member 48.

Figure 6:
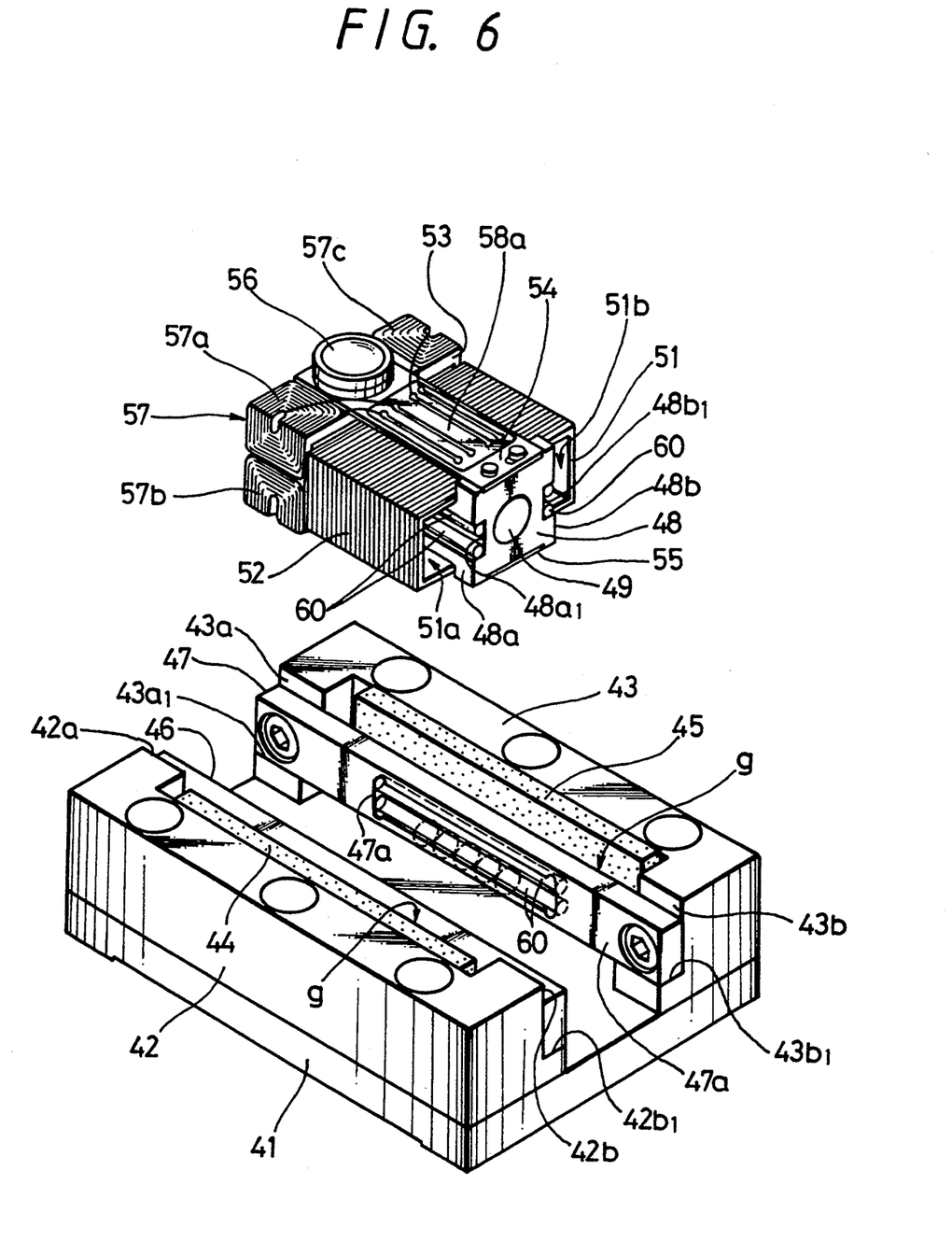
FIG. 6 is an exploded perspective view of a main portion of the present invention.

Flat coils 57a, 57b, 57c and 57d are molded as L-letter shape and are secured to four corners of the objective lens supporting member 53, respectively, whereby horizontal portions of the respective flat coils in the two side surfaces of the supporting member 53 are operated as a focusing coil 57 which might be referred to as a second coil. The flat coils 57a, 57b, 57c and 57d are respectively conducted by bonding flexible printed circuit boards 58a, 58b to the parallel plate springs 54 and 55. When the flexible printed circuit boards 58a and 58b are bonded to the parallel plate springs 54 and 55, a resonance of the parallel plate springs 54 and 55 can be suppressed. Therefore, a silencing characteristic due to the resonance of the parallel plate springs 54 and 55 can be suppressed. Therefore, a silencing characteristic due to the resonance of the parallel plate springs 54 and 55 can be improved considerably. Preferably, the parallel plate springs 54 and 55 are each made of a nonmagnetic material such as helium bronze, phosphor bronze and the like. The focusing coil 57 may be formed by bending wound wires of square shape in an L-letter shape as described above. Alternatively, the focusing coil 57 may be formed by using the flexible printed board. When the focusing coil 57 is formed by using the flexible printed circuit board, the focusing coil 57 can be easily coupled to the flexible printed circuit board secured to the aforenoted parallel plate springs 54 and 55.

Further, a reflection mirror 59 is adapted to change a light path and is secured to a portion in which the front and rear direction through-hole 49 and the upper and lower direction through-hole 50 of the movable member 48 cross each other so that optical axes of light beams travelling through the apertures 49 and 50 are placed at a right angle, i.e., 90 degrees by means of the reflection mirror 59.

Inside yokes 46 and 47 are inserted into the pair of through-holes 51a and 51b of the movable member 48 through a hollow portion of the objective lens supporting member 53.

Figure 4:
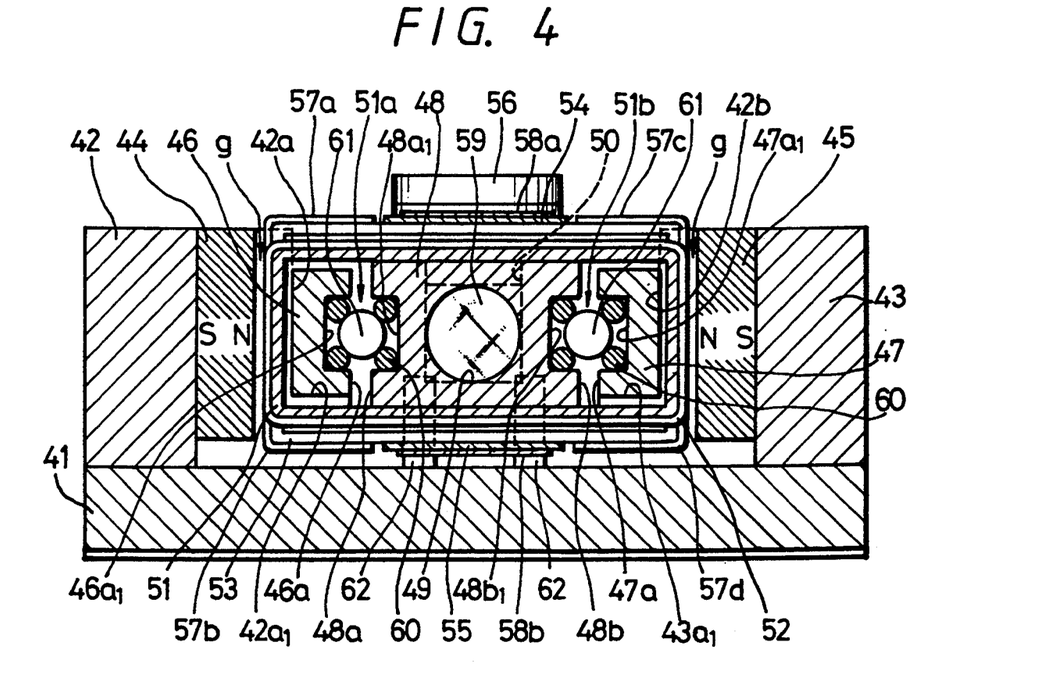
FIG. 4 is a transverse sectional view taken on the line II—II in FIG. 3, and illustrating the optical pickup apparatus of the present invention in a large-scale.

Guide grooves 48a₁, 48b₁ and 46a₁, 47a₁ of U-letter shape cross section are respectively formed on the inner surfaces of the through-holes 51a and 51b, i.e., on the side surfaces 48a and 48b of the movable member 48 and magnet-non-opposing surfaces 46a, 47a of the inside yokes 46 and 47 opposing the side surfaces 48a and 48b. A shaft 60 is respectively formed at each of the corners of the guide grooves 48a₁, 48b₁ and 46a₁, 47a₁.

Each of the shafts 60 is formed by grinding an outer surface of a rod molded from ceramics, stainless steel and the like. These shafts 60 are secured to the corners of the guide grooves 48a₁, 48b₁, 46a₁ and 47a₁ by means of a bonding agent (not shown). Accordingly, four shafts 60 are provided at the two side portions of the movable member 48 in an opposing relation to each other.

Balls 61 are respectively interposed between four shafts 60 each, i.e., between a pair of shafts 60 of the guide groove 48a₁ provided on one side of the movable member 48 and a pair of shafts 60 of the guide groove 46a₁ of one inside yoke 46 and between a pair of shafts of the guide groove 48b₁ of the other side surface and a pair of shafts 60 of the guide groove 47a₁ of the other inside yoke 47. It is desired that these balls 61 are each made of non-magnetic material such as, stainless steel, ceramics, ruby, sapphire or the like.

Figure 5:
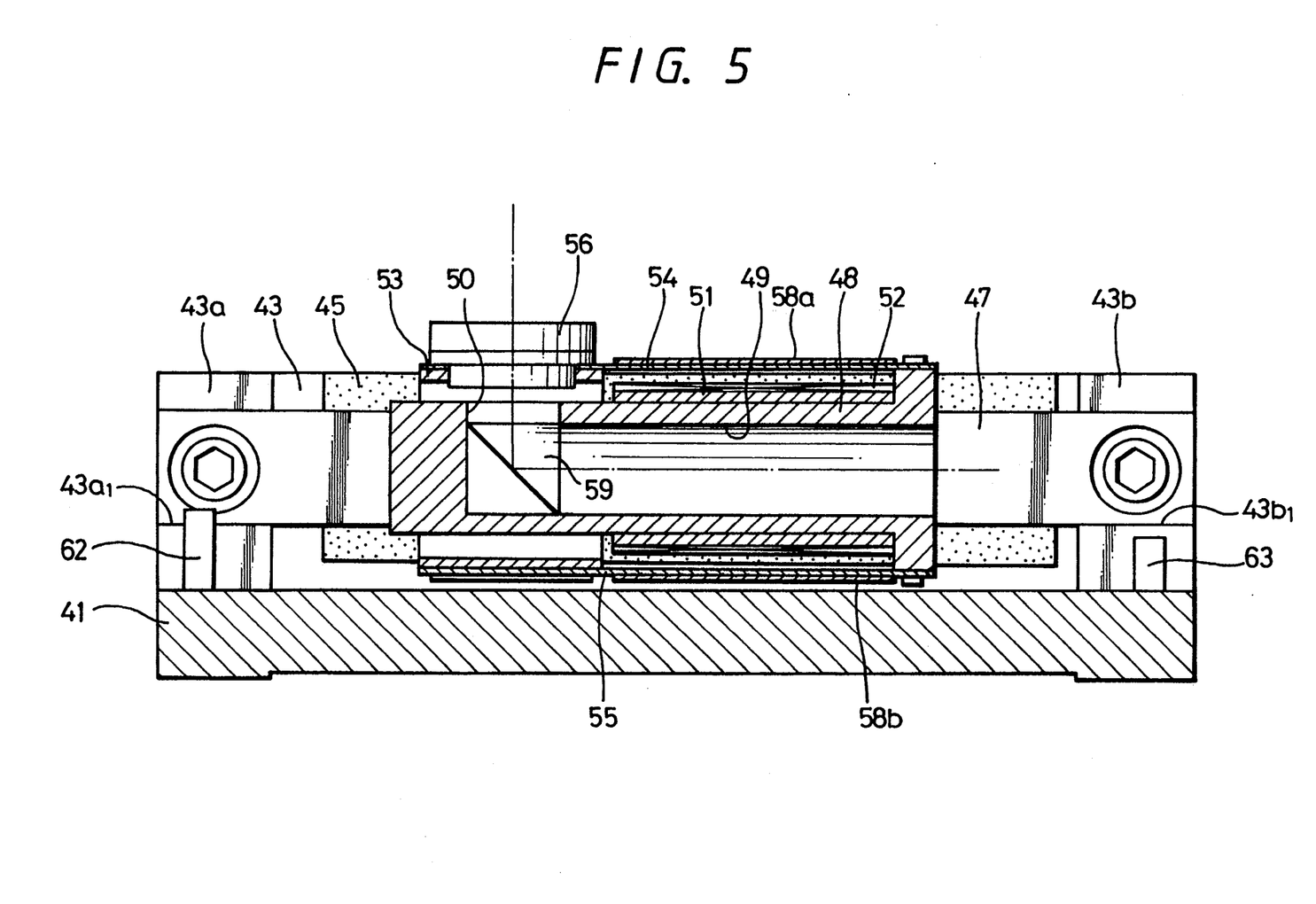
FIG. 5 is a longitudinal sectional view illustrating the optical pickup apparatus of the present invention in a large scale.

In this way, the movable member 48 is supported to the inside yokes 46 and 47 via the balls 61 so as to become freely movable along the inside yokes 46 and 47. During the movement of the movable member 48, the ball 61 rotates between the shafts 60, each of whose outer surface is ground, whereby the movable member 48 can move stably and accurately. Stoppers 62 and 63 are implanted on the front and rear ends of the surface of the base plate 41 in order to stop the movable member 48 at a predetermined position during the movement of the movable member 48. The stoppers 62 and 63 are each made of acrylonitrile butadience styrene copolymer, rubber and the like.

Figure 3:
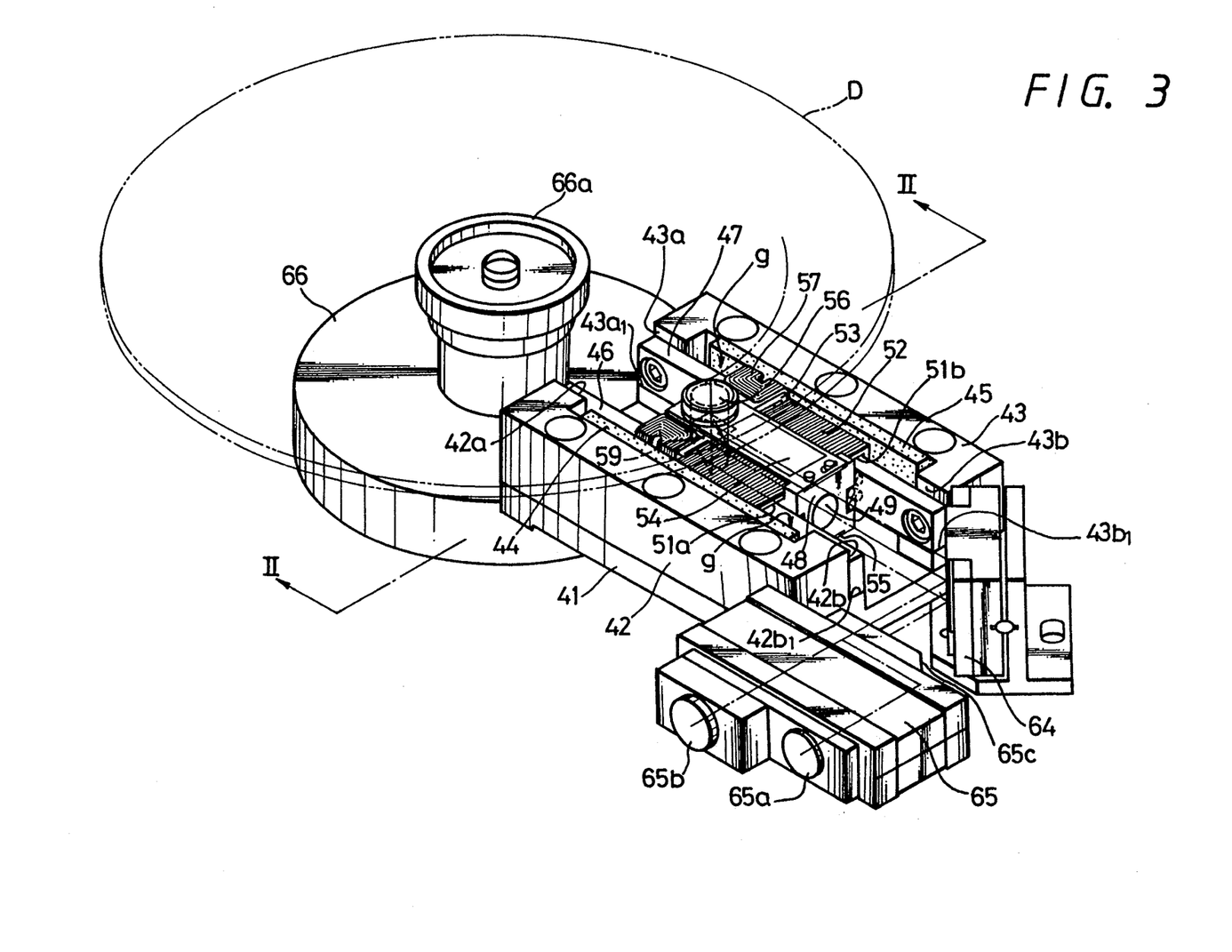
FIG. 3 is a perspective view illustrating an embodiment of an optical pickup apparatus according to the present invention.

As shown in FIG. 3, there is provided a galvanomirror 64 that is located in the direction at an angle of substantially 45 degrees to the direction in which the front and rear direction through-hole 49 of the movable member 48 is extended rearwards. A read-out optical system 65 is located in the direction at an angle of substantially 45 degrees to the galvanomirror 64. The read-out optical system 65 is comprised of a laser diode 65a, a photodiode 65b, a beam splitter 65c and the like.

Further, in this embodiment, the read-out optical system 65 and the galvanomirror 64 constitute a stationary optical system and the reflection mirror 59 and the objective lens 56 constitute a movable optical system. These stationary and movable optical systems are located on the same plane, whereby the thickness of the whole optical pickup head apparatus can be reduced.

More precisely, the stationary optical system formed of the read-out optical system 65 and the galvanomirror 64 and the movable optical system formed of the reflection mirror 59 and the objective lens 56 are respectively located so that the optical axis of the light path through which a light beam emitted from the laser diode 65a of the read-out optical system 65 reaches the reflection mirror 59 and the optical axis of the light path in which a reflected-back laser beam from the optical disc D reaches the photodiode 65b from the reflection mirror 59 are provided on the same plane. Whereas, the reflection mirror 59 is located so that the optical axis of the light path in which the laser beam emitted from the laser diode 65a reaches the optical disc D via the reflection mirror 59 and the optical axis of the light path in which the reflected-back laser beam from the optical disc D reaches the reflection mirror 59 become perpendicular to the above-described plane.

In accordance with this embodiment, however, the light path in which the laser beam reaches the reflection mirror 59 via the beam splitter 65c and the galvanomirror 64 and the light path between the reflection mirror 59 and the optical disc D are made common to the light beam from the laser diode 65a and the reflected-back light beam from the optical disc D. Therefore, the emitted light beam and the reflected-back light beam are distributed by the beam splitter 65c so that the emitted light beam reaches the galvanomirror 64 while the reflected-back light beam reaches the photodiode 65b.

As described above, the laser beam emitted from the laser diode 65a of the read-out optical system 65 is introduced into the photodiode 65b of the read-out optical system 65 via the galvanomirror 64, the reflection mirror 59, the objective lens 56, the optical disc D, the objective lens 56, the reflection mirror 59 and the galvanomirror 64, in that order. In that case, a focusing error signal and a tracking error signal are generated on the basis of the detected output from the photodiode 65b. As will be described later, the focusing error signal is supplied to the focusing coil 57, and the tracking error signal is supplied to the galvanomirror 64. The galvanomirror 64 performs the tracking servo by rotating the mirror thereof on the basis of the tracking error signal so that the light beam spot on the optical disc D moves across the tracks formed on the optical disc D.

Turning to FIG. 3, there is shown a spindle motor 66 which rotates the optical disc D. The spindle motor 66 is coupled to a disc table 66a on which there is chucked the optical disc D according to the predetermined chucking method.

As described above, the movable member 48 is supported to the inside yokes 46 and 47 via the balls 61, and the respective side portions of the slide drive coil 52 wound around the bobbin 51 and the horizontal portions of the side surface sides of the deflection coils 57a to 57d secured to the objective lens supporting member 53, i.e., the focusing coil 57 are placed within the magnetic gaps g between the magnets 44, 45 and the inside yokes 46, 47, whereby the magnetic circuits of the slide motor and the focusing motor are made common.

Further, the inside yokes 46 and 47 form a closed magnetic path with the outside yokes 42 and 43 attached to the base plate 41 and also serves as the guide shafts for guiding the movable member 48 so that a guide shaft and a slidable base plate are not needed additionally.

In the thus constructed optical pickup head apparatus of the present invention, when the slide driving coil 52 wound around the bobbin 51 of the movable member 48 is energized on the basis of an access command or the like from, for example, a control circuit (not shown), the movable member 48 is given a driving force by the action of the magnetic field within the magnetic gaps g and the current, whereby the movable member 48 can be moved in the front or rear direction along the inside yokes 47 which serve as the guide shafts, i.e., the movable member 48 can be moved in the radial direction of the optical disc D in a linear motor system.

Furthermore, when the focusing error signal generated on the basis of the detected output from the photodiode 65b is supplied to the flat coils 57a to 57d fixed to the objective lens supporting member 53, this objective lens supporting member 53 is moved by the parallel plate springs 54 and 55 in the upper or lower direction in parallel to the optical axis of the objective lens 56 due to the action between the current flowing through the horizontal portions of the respective coils located within the magnetic gaps g and the magnetic field produced within the magnetic gaps g, thereby the focusing of the objective lens 56 relative to the optical disc D being adjusted. In this way, the read-out optical system 65 reads (i.e., reproduces) the optical disc D.

For example, the movable member 48 can be unitarily formed with the bobbin 51 as one body. Further, either the guide grooves 48a₁, 48b₁ or 46a₁, 47a₁ or both of the guide grooves 48a₁, 48b₁ and 46a₁, 47a₁ of the inside yokes 46 and 47 and the movable member 48 can be shaped to have a cross-section of V-letter. If the two guide grooves are shaped to have the cross-section of V-letter, then the shafts can be omitted. Also, the number of the balls interposed between the guide grooves can be increased and/or decreased, if necessary.

Furthermore, the layout of the read-out optical system 65 and the like can be freely modified in response to the arrangement of the optical disc recording and/or reproducing apparatus.

In addition, by applying the optical pickup head apparatus of this invention to a magneto-optical disc recording and/or reproducing apparatus, it is possible to reduce the thickness of the recording and/or reproducing apparatus considerably, which has been one of very difficult problems that the prior art cannot solve because an external magnetic field generating apparatus must be provided at the disc surface side opposite to the recording and/or reproducing apparatus across the magneto-optical disc in the prior-art magneto-optical disc recording and/or reproducing apparatus.

As set out above, according to the present invention, since the magnetic circuits of the slide drive motor which moves the objective lens in the radial direction of the optical disc and of the focusing motor which moves the objective lens in its optical axis direction can be made con, non, the movable member side does not need the heavy magnet so that the mass of the movable member side can be reduced. Also, a mutual interference can be avoided between the magnetic circuits of the two motors and a magnetic neutral portion can be prevented from being produced in the movement of the objective lens, thus making it possible to stably move the objective lens at high speed. Therefore, a reliability of the optical pickup head apparatus of the invention can be increased more. Furthermore, the assembly parts such as the magnets and the like can be reduced and the number of the assembly process can be reduced, which provides a reduced cost.

Having described a preferred embodiment of the invention with reference to the accompanying drawings, it is to be understood that the invention is not limited to that precise embodiment of the invention and that various changes and modifications could be effected by one skilled in the art without departing from the spirit or scope of the invention as defined in the appended claims.

I claim as my invention:

1. An optical pickup head apparatus having a tracking error signal generating device for a tracking error signal on the basis of a detected output a photodetecting device and a tracking control device for performing a tracking servo by rotating a mirror in response to the tracking error signal supplied thereto, which apparatus comprises:

a magnet;
yoke means provided in an opposing relation to said magnet;
a movable member having an aperture into which said yoke means is inserted;
a first coil wound around said movable member in opposing relation to said magnet.;
an objective lens having an optical axis; and
objective lens supporting means for supporting said objective lens to be movable in a direction parallel to said optical axis and having a plurality of second coils to move said objective lens in said direction, wherein said supporting means is secured to said movable member, said movable member is supported by said yoke means so that it can freely move in a direction perpendicular to said optical axis, and at least one side of said first and second coils is located within a common magnetic gap;
wherein each of said second coils has four sides and is formed as a substantially square coil of L-letter shape, a pair of sides of each of said second coils being perpendicular to the optical axis of said objective lens and one side of each of said second coils being located within said common magnetic gap.

2. An optical head apparatus comprising:

a fixed optical system including a light beam source, a photodetector, and a beam splitter for splitting a light beam emitted from said light beam source, so that a portion of the light beam is irradiated on said photodetector;

a movable optical system having an objective lens, a first coil, a focussing actuator for supporting said objective lens and for moving said objective lens in a direction parallel to an optical axis of said objective lens using at least one of a plurality of second coils, each having four sides and being formed as a substantially square coil of L-letter shape, a pair of sides of each of the plurality of second coils being formed perpendicular to the optical axis of said objective lens, one side of each of the plurality of second coils being formed parallel to the optical axis of the objective lens, a member provided on said actuator, a linear motor including magnets provided to face said first coil and said sides of said plurality of second coils parallel to said optical axis, whereby said sides of said plurality of second coils parallel to said optional axis are within a common magnetic gap formed by said magnets of said linear motor, guiding means for guiding said member in a direction perpendicular to the axis of said objective lens, and a yoke, said movable optical system being provided in a plane that is parallel to the direction perpendicular to the axis of the objective lens and said fixed optical system being provided in said same plane; and a tracking means provided between said fixed optical system and said movable optical system and including a mirror for changing a path of the light beam emitted from said light beam source and the light beam irradiated on said photodetector.

* * * * *

UNITED STATES PATENT AND TRADEMARK OFFICE
CERTIFICATE OF CORRECTION

PATENT NO.   :   5,347,500
DATED        :   September 13, 1994
INVENTOR(S)  :   Naoya Eguchi It is certified that error appears in the above-indentified patent and that said Letters Patent is hereby corrected as shown below:

```
Col. 2, line 30, delete "of"
Col. 3, line 35, delete "of"
Col. 7, line 24, change "serves" to --serve--
        line 37, after "yokes" insert --46, --
Col. 8, line 17, change "con, non" to --common--
```

In the Claims:

```
Col. 8, line 40, after "for" insert --generating--
        line 41, after "output" insert --from--
        line 51, after "in" insert --an--
        line 58, after "said" first occurrence,
        insert --objective lens--
```

Signed and Sealed this

Sixth Day of June, 1995

BRUCE LEHMAN

*Attest:*

*Attesting Officer*   *Commissioner of Patents and Trademarks*